United States Patent [19]

Turner et al.

[11] Patent Number: 5,640,252
[45] Date of Patent: Jun. 17, 1997

[54] BOUND DOCUMENT IMAGER WITH PAGE TURNER

[75] Inventors: William D. Turner, San Marino; Robert P. Kowalski, Campbell; Sven E. Karlsson, San Jose, all of Calif.

[73] Assignee: Xerox Corporation, Stamford, Conn.

[21] Appl. No.: 570,880

[22] Filed: Dec. 12, 1995

[51] Int. Cl.⁶ .................................................. H01L 27/14
[52] U.S. Cl. .......................................... 358/497; 358/498
[58] Field of Search ............................... 358/497–498, 358/474; 355/25, 308; 271/191, 193, 195

[56] References Cited

U.S. PATENT DOCUMENTS

| | | | |
|---|---|---|---|
| 3,484,970 | 12/1969 | Berlinsky et al. | 40/104 |
| 3,550,296 | 12/1970 | Castagna | 40/104 |
| 3,888,584 | 6/1975 | Smith | 355/75 |
| 4,208,123 | 6/1980 | Stevenson | 355/25 |
| 4,585,334 | 4/1986 | Malyon | 355/25 |
| 4,636,868 | 1/1987 | Malyon | 358/285 |
| 4,645,332 | 2/1987 | Malyon | 355/25 |
| 4,655,478 | 4/1987 | Malyon | 281/45 |
| 4,663,873 | 5/1987 | Shinbrot | 40/531 |
| 4,673,286 | 6/1987 | Shinbrot | 355/25 |
| 4,693,594 | 9/1987 | Garavuso et al. | 355/25 |
| 4,780,977 | 11/1988 | Howard et al. | 40/531 |
| 4,916,839 | 4/1990 | Nakanishi | 40/475 |
| 5,017,989 | 5/1991 | Street et al. | 357/30 |
| 5,247,755 | 9/1993 | Sato et al. | 40/476 |
| 5,325,213 | 6/1994 | Takahashi et al. | 358/497 |
| 5,359,207 | 10/1994 | Turner | 257/81 |
| 5,471,277 | 11/1995 | Fujioka et al. | 355/25 |

FOREIGN PATENT DOCUMENTS 2 287 546 A  9/1995  European Pat. Off. .

OTHER PUBLICATIONS

Omnia OK 301 P, "The Unique Prism Camera System," by Zeutschel, four pages. (No publication date).

*Primary Examiner*—Stephen Brinich

[57] ABSTRACT

An apparatus for imaging books or other bound documents with minimal stress being applied to the book structure, and for successively imaging and turning pages of a book without the need for manual intervention. The book imager includes a support, for placement of a book in an open position, an imager having opposed imaging surfaces capable of simultaneously imaging the entire exposed, facing adjacent pages of the book in a distortion preventing manner, and a page turner. The support and the imager are relatively movable toward and away from one another, from a first position in which imaging is effected, to a second position in which page turning is effected.

22 Claims, 7 Drawing Sheets

BOUND DOCUMENT IMAGER WITH PAGE TURNER

FIELD OF THE INVENTION

The present invention relates to an apparatus for simultaneously imaging both pages of an open book or other bound document, with minimal stress being applied to the book structure, and for successively imaging and turning pages of the book without the need for manual intervention.

BACKGROUND OF THE INVENTION

The technology relating to the reproduction of documents has consistently advanced over time. At present, the traditional light lens copier utilizes xerographic means to automatically reproduce large quantities of stacked paper at a rate of over 100 pages per minute. Current printing technology, at comparable speeds, employs raster output scanning means to output a stored image, in digital form, onto a recording medium by way of various marking technologies, e.g. by electrostatographic reproduction or inkjet printing. Scanning technology, as well as the more recently evolving 2-dimensional imaging array technology, converts an original document image into digital form, which digital data may then be transferred to a digital printer for output onto a recording medium, such as paper.

While the process of reproducing stacked documents has advanced rapidly, the process of reproducing multiple successive pages of a book or other bound volume of pages has inherent limitations that have prevented comparable advances. A primary limitation of bound document reproduction is the requirement of manual intervention for turning individual pages of the book during the reproduction process. This manual intervention is a significant demand on both manpower and time. With the traditional copier or scanner, stress is applied to the book from the constant handling of the book by the user. The user must repeatedly lift the book from the flat imaging surface and turn the individual book pages, so that subsequent pages or sets of pages may be reproduced. Additional stress is applied to the binding when the book is fully laid open in a substantially flat position against a platen. Furthermore, in an attempt to minimize the amount of distortion that often appears on the reproduced image in the binding region of the pages, the user will often apply yet an additional force to the spine of the book in order to flatten the pages against the imaging surface. These stresses to the book are particularly hazardous to older and/or historical volumes of books.

In order to alleviate the stress applied to the bindings, the platen has been moved to the edge of the cabinet, allowing the book to remain in a relaxed state while being imaged, as illustrated in Smith, U.S. Pat. No. 3,888,584.

Solutions to the manual page turning problem, have looked to automatic page turning mechanisms. Typical of these are:

Berlinsky et al, U.S. Pat. No. 3,484,970, in which a book is laid flat upon a support and an automatic sheet turner using a rotating vacuum head grabs a page and flips it from one side to the other side. Subsequently, a brush follows the path of the roller, sweeping and smoothing out the turned page.

Castagna, U.S. Pat. No. 3,550,296, in which a book is held partially open upon a support and a page turner device, including a suction arm, is used to lift and flip the pages. A constant vacuum force applied through the arm initially causes the page that is to be turned to be lifted. Thereafter, the angular movement of the arm while moving the page to the opposite side of the book, causes the page to disengage from the arm and fall to its respective turned position.

Howard et al, U.S. Pat. No. 4,780,977, in which a book is laid flat upon a support and a page turning apparatus including an arm having a vacuum associated therewith turns the pages.

Nakanishi, U.S. Pat. No. 4,916,839, in which a book is laid flat upon a support and a mechanical means for applying friction to a page to be turned, in combination with air, is used to form a buckle in the page. A sliding plate surface in contact with the buckled page is used to complete the page turning function.

It is also known to provide page turning mechanisms for books in combination with optical systems for capturing the page images. Typical of these are:

Shinbrot, U.S. Pat. No. 4,663,873, in which an electrostatographic copier incorporates a device for turning pages of an open book. The book is laid flat on a support and an air jet initially separates the pages. A vacuum wheel then picks up the separated page and then flips the page to the opposite side of the book. The book is lowered to turn its pages and is then urged into contact with a glass plate for imaging.

Shinbrot, U.S. Pat. No. 4,673,286 and Garavuso et al, U.S. Pat. No. 4,693,594, in which an electrostatographic copier has a device for turning pages of an open book which is laid flat in a page down position on a moving surface relative to an optical system.

In each of these mechanisms (with the exception of Castagna) the book is fully laid open in a substantially flat position. If forced into this position, there is a high likelihood that the binding may be stressed and damaged. Also, in this position, the quality of reproduction may be severely impaired because when the book is laid flat, the bulk in the pages adjacent the binding will lie curved, and not flat, thus distorting the optical depth of field. If the distortion is too great, it is likely that an incomplete image will be formed.

The objects of the present invention are to overcome the problems of the known book imagers and to provide an apparatus which will allow book pages to be reproduced accurately with high resolution, rapidly and automatically, without manual intervention, and with no structural damage to the book itself.

SUMMARY OF THE INVENTION

These objects are accomplished, in one form, by the present invention which includes a book imager having a support upon which a book may be positioned in a partially open, relaxed, state with minimal stress being applied to the book structure. An imaging device having a pair of imaging surfaces, each of which is capable of capturing a two-dimensional digital representation of a page, is moved by a drive assembly from a first position to a second position, such that in the first position, said imaging device is located in close proximity to the support to enable imaging of at least one page of the book, and in the second position, the imaging device is located sufficiently remote from the support to enable a page of the book to be turned. A page turner advances one page at a time for subsequent imaging.

DETAILED DESCRIPTION OF DRAWINGS

Turning now to FIGS. 1 to 5, there is illustrated and described a preferred embodiment of the bound document imager 2 of the present invention (hereinafter referred to as "book imager"). The operation of the book imager 2 is subsequently described with reference to FIGS. 4 and 6 to 8.

For the purposes of the present description, the term "book" is used and is intended to include, not only books having either a hard cover or a soft cover, but also periodicals, manuscripts, and any other compilation of bound or joined pages. Additionally, the term "image" or "imaging" is intended to include any manner of digital image capture known in the art, which enables subsequent image reproduction or image manipulation.

Figure 1:
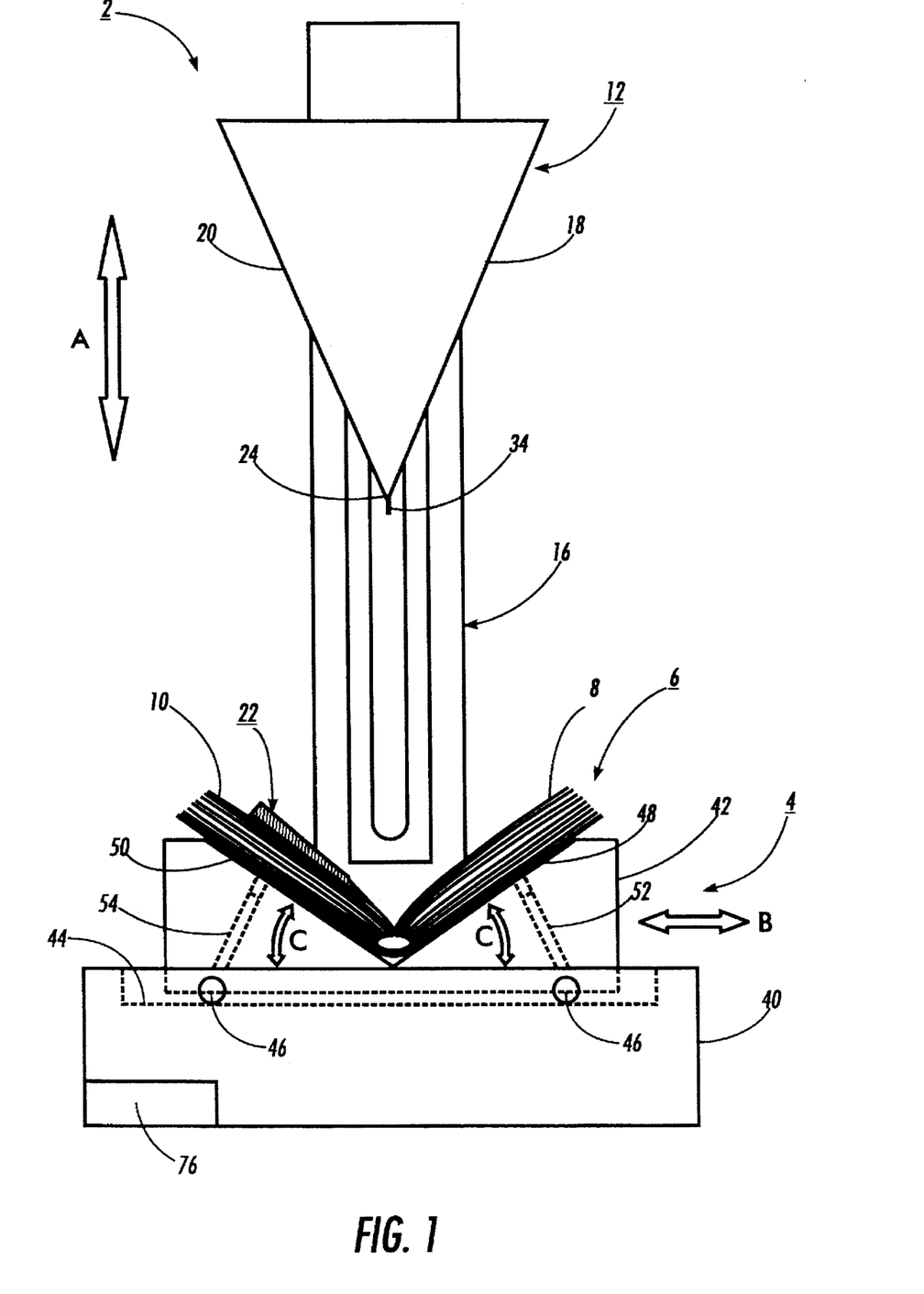
FIG. 1 is a front elevational view of a preferred embodiment of the book imager apparatus of the present invention, shown in the page turning position.

The book imager 2 includes a support base 4 upon which a book 6 rests in an open position with exposed pages 8 and 10 facing upward. It should be noted that the book rests in a relaxed manner at an open angle of less than 180 degrees, so as not to apply stress to the binding. An imaging device 12 capable of simultaneously capturing the images of both pages is positioned above the support base 4. A drive assembly 14 (see FIG. 3), housed in upright standard 16, is provided to raise and lower the imaging device 12 with respect to the support base 4, as indicated by arrow A, from a position in which the imaging device and the support base are proximate, to a position in which they are remote. A page turning assembly 22 is provided to turn page 8 over page 10 so that a successive set of pages may be exposed and positioned to be imaged.

Figure 2:
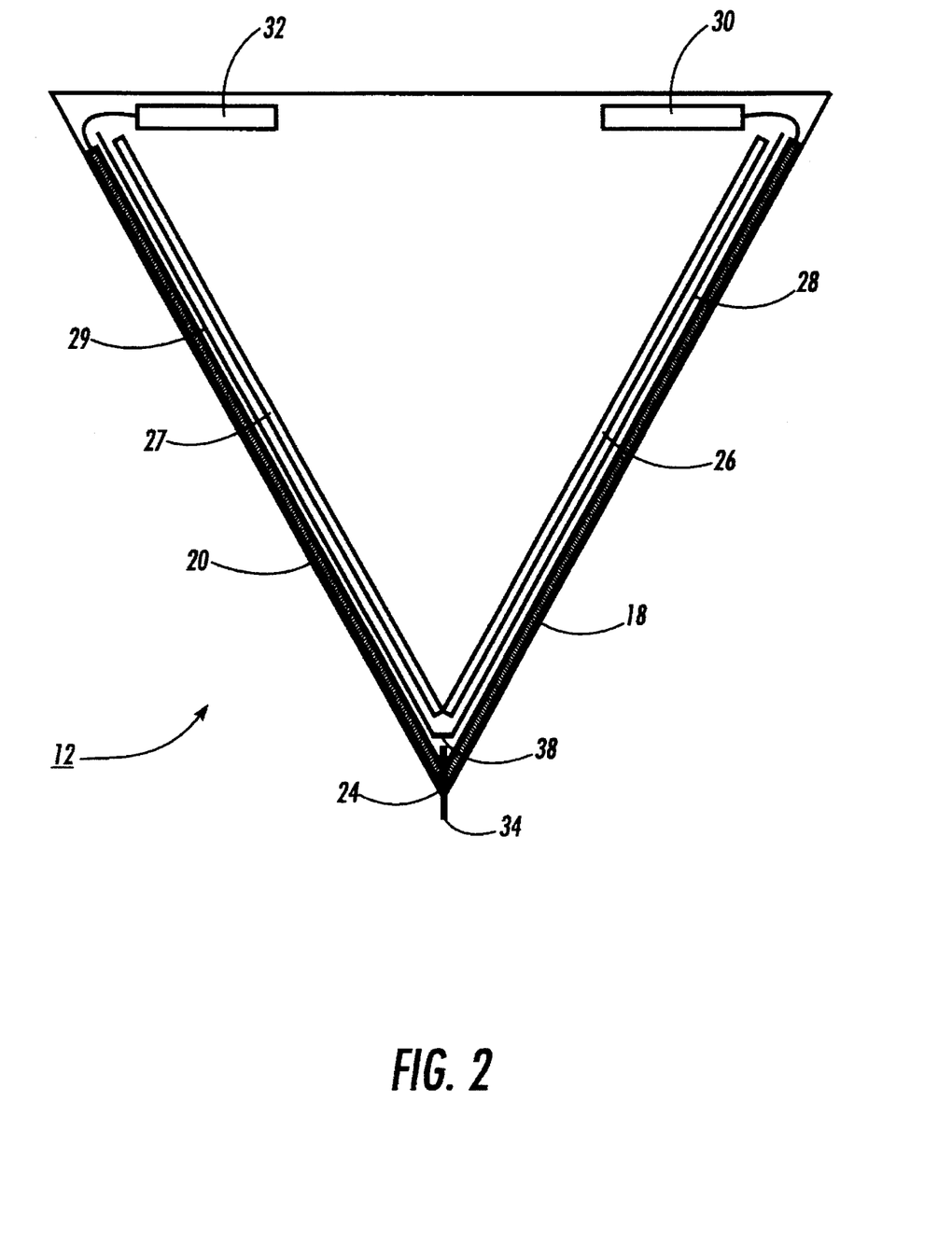
FIG. 2 is a side sectional view taken through the imaging device of the book imager.

As illustrated in FIG. 2, the imaging device 12 incorporates a pair of flat panel detector arrays 18 and 20 capable of substantially simultaneously imaging both of the exposed pages 8 and 10. Each of the detector arrays comprises a thin glass substrate sheet upon which are formed an array of thin film transistors and sensors that function as pixel element detectors. The arrays are disposed in a wedge configuration, meeting at a common edge 24. An exemplary wedge-shaped imaging device, incorporating two-dimensional detector arrays comparable to those of the present invention, is described in U.S. Pat. No. 5,359,207 issued to Turner, and is hereby incorporated by reference. Detector arrays of this type advantageously are able to capture an image without moving mechanical parts. An exemplary two-dimensional detector array comparable to that in use in the present invention, is described in U.S. Pat. No. 5,017,989 issued to Street et al and in U.S. Pat. No. 5,079,426 issued to Antonuk et al, both of which are also hereby incorporated by reference.

Disposed within the imaging device 12 are illumination sources 26 and 27, such as planar electroluminescent (EL) lamps commercially available through Loctite Luminescent Systems, Inc., provided for illuminating the images on pages 8 and 10 through the detector arrays. A thin layer of light diffuser material 28 and 29, such as plexiglass, may be sandwiched between and in contact with the detector arrays 18 and 20 and EL lamps 26 and 27 to improve light uniformity. Alternatively, the pages could be illuminated through the detector arrays by a combination of translucent blocks, suitable light sources, and suitable optics, whereby light beams emanating from the lights enter the translucent blocks and are reflected along the translucent blocks which cause diffuse light to be emitted over the entire area of the detector array. As a further alternative, a standard backlighting arrangement as used in current liquid crystal displays may also deliver reasonably diffused lighting for the purposes of the present invention.

The addressing and readout interconnects, schematically illustrated as blocks 30 and 32 are coupled to each detector array 18 and 20, respectively, along one edge. As the wedge apex edge 24 is free of interconnects, it is possible to fabricate the pixel element detectors on the substrate close to that edge, maximizing the imaging surface of the array. This feature is particularly advantageous for obtaining a complete image of the page adjacent the spine.

A position sensor 34, located at the wedge apex edge 24, extending beyond the imaging device 12, is retractable therein upon interference with the book 6 as the imaging device is driven towards the book by the drive assembly 14. When the position sensor actuates switch 38 a signal is generated to arrest movement of the drive assembly. It should be understood that the present invention is not limited to the sensor described, and that any suitable sensor may be used, such as, for example, a magnetic or capacitive proximity sensor, or an optical detector. Furthermore, the position sensor may be located anywhere the described sensing function can be accomplished.

Referring again to FIG. 1, the support base 4 comprises a stationary base 40 and a carriage 42 supported thereon in a seating cavity 44. Rollers 46 on carriage 42, enable its lateral movement within the seating cavity 44, in the direction of arrow B. A pair of pivotably mounted support plates 48 and 50 are each secured to the carriage for angular movement about one edge, as indicated by arrows C. Pneumatic pistons 52 and 54 secured at one end to the carriage and at their opposite ends to plates 48 and 50 move the plates, as indicated, when actuated. While it is preferred that the support plates normally lie at an angle, as illustrated, for supporting the book in a partially open, relaxed, position, it is possible to allow the support plates to lie flat prior to and subsequent to imaging.

Figure 3:
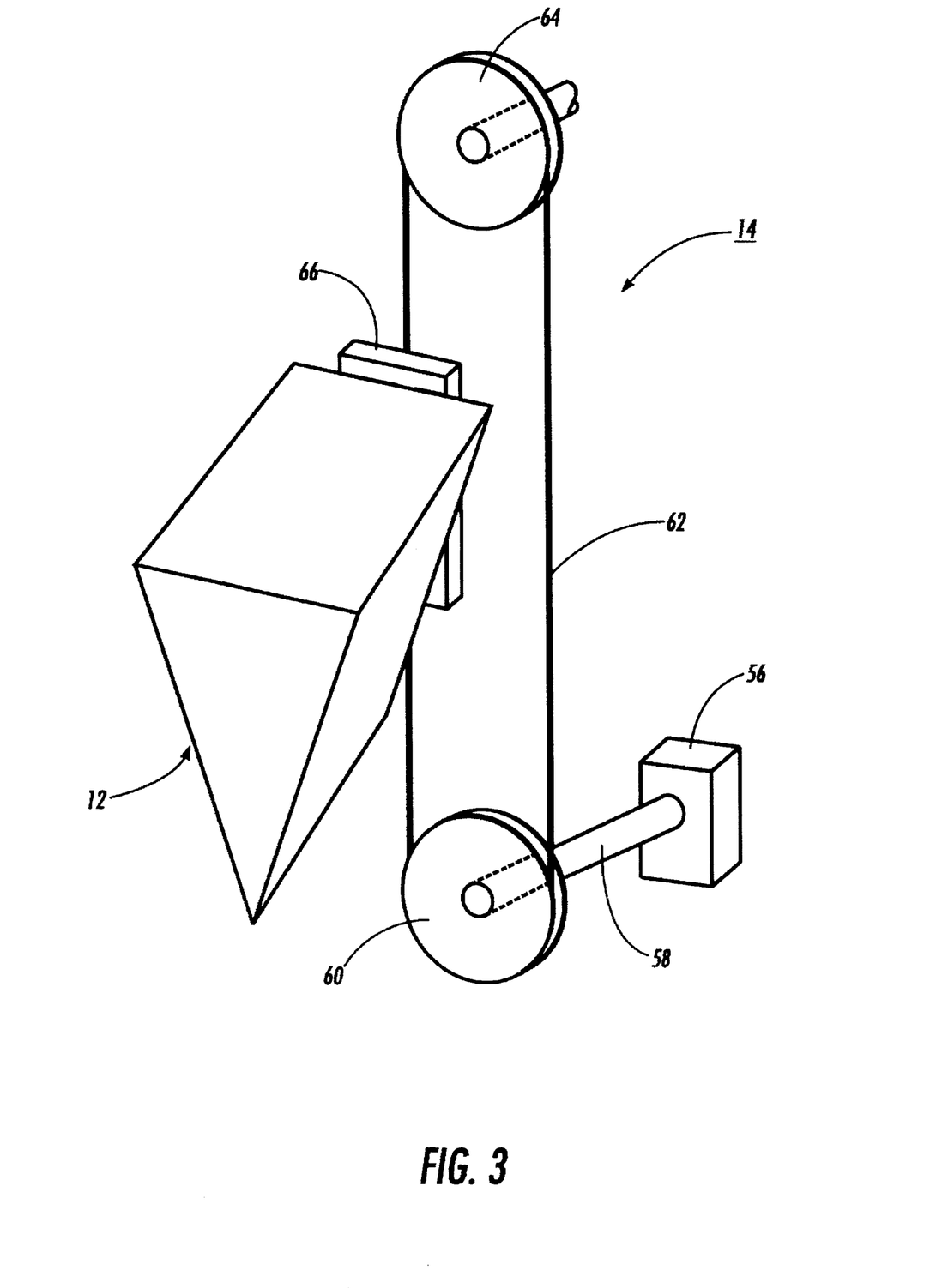
FIG. 3 is a schematic perspective view of the drive assembly of the book imager.

As illustrated in FIG. 3, the drive assembly 14 is operatively associated with the imaging device 12 to impart vertical relative movement between the imaging device and the support base 4. Drive assembly 14 includes a motor 56, preferably a reversible stepper motor, having a drive shaft 58 on which is secured drive gear 60. A chain 62 is in engagement with drive gear 60 and idler gear 64. The imaging device 12 is affixed to a mounting plate 66, fastened to the chain 62, so that the imaging device 12 may be reciprocally driven in a vertical direction between the, lower, imaging position and the, upper, page turning position. It should be understood that any suitable driving mechanism can be used to move the imaging device, as shown, to move the support base relative to a stationary imaging device, or to move both the imaging device and the support base.

Figure 4:
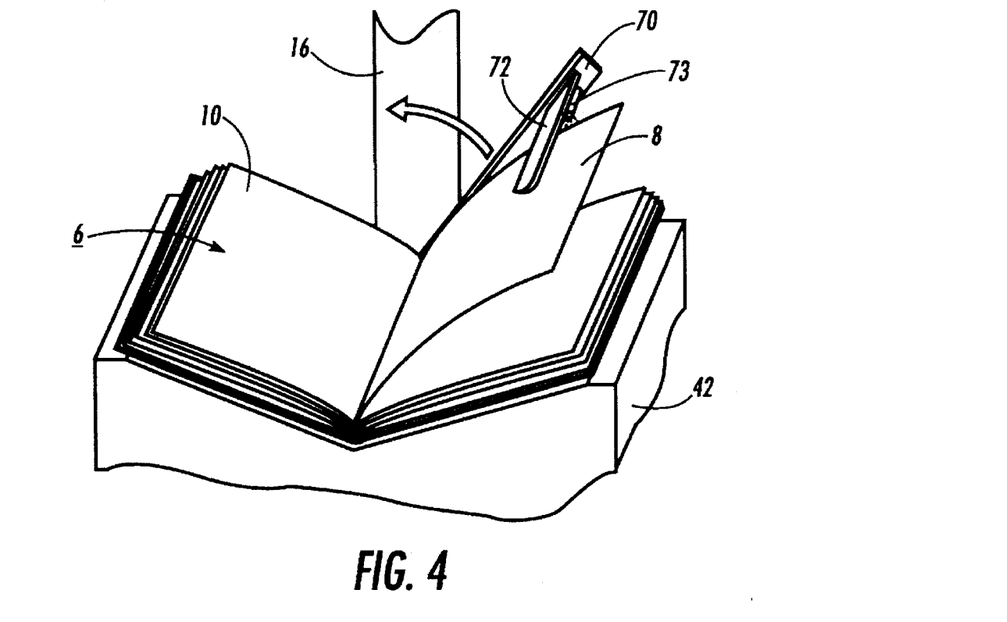
FIG. 4 is a perspective view of the page turner assembly.
Figure 5:
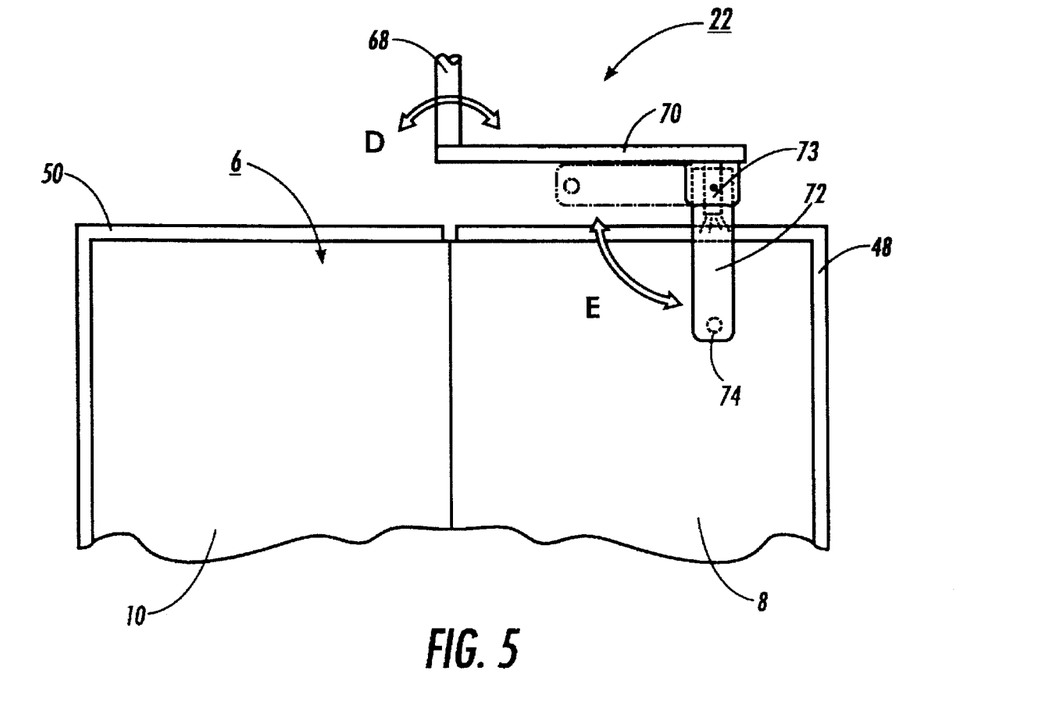
FIG. 5 is a plan view of the page turner assembly of the book imager.
Figure 8:
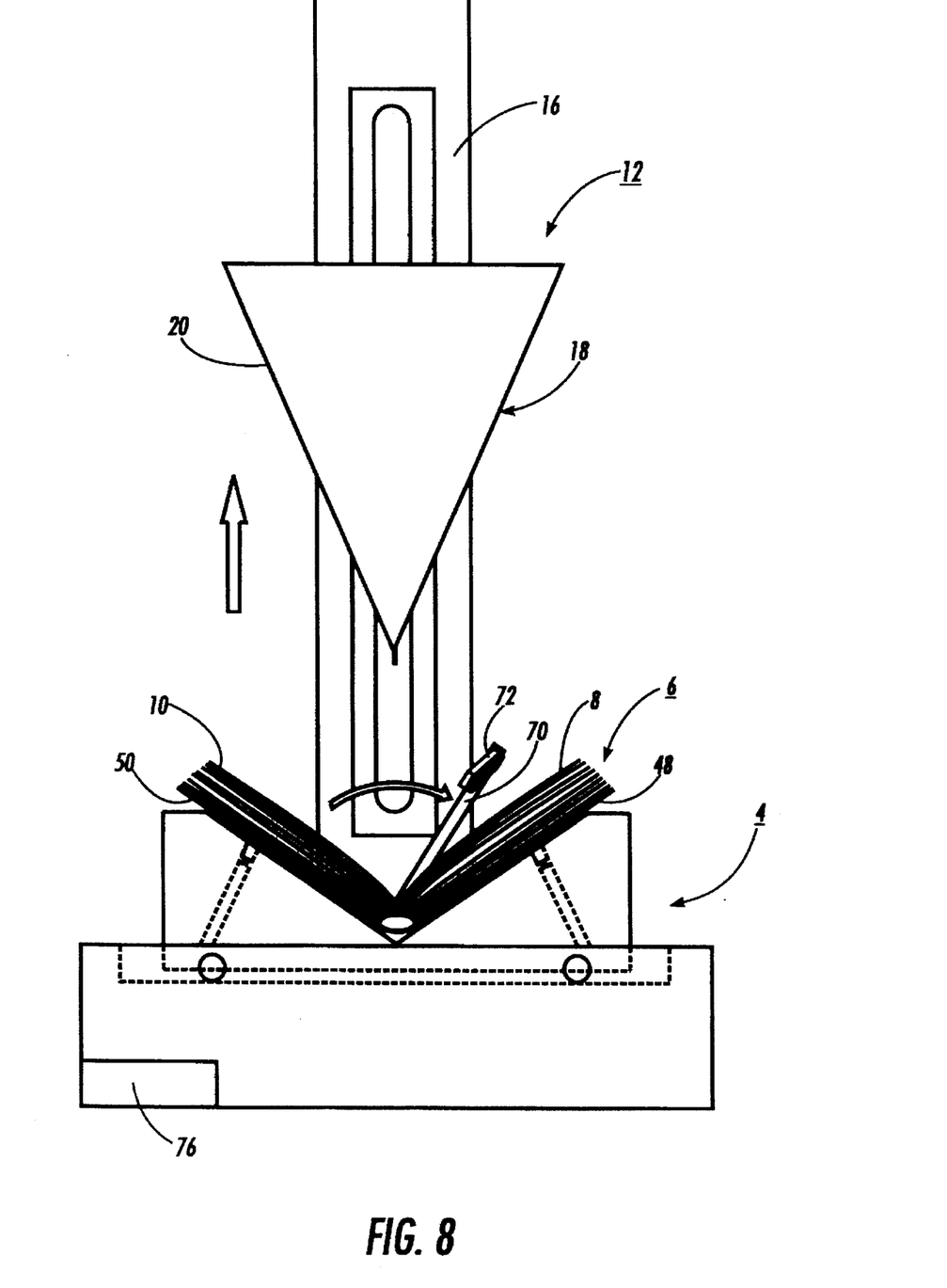
FIG. 8 is a front elevational view of the book imager shown in transition from the imaging position of FIG. 7 to the page turning position of FIG. 1.

Page turning assembly 22, as illustrated in FIGS. 4 and 8, includes a rotatable pivot shaft 68, driven in timed relation to movement of the drive assembly in the direction indicated by arrow D, to which is secured one end of pivot arm 70 at whose opposite end is secured a foldable page pick-up wand 72 and an air-knife nozzle 73. The foldable wand 72 is movable in the direction of arrow E, from a page pick-up position overlying page 8 to a book clearing position (shown in dotted lines). An orifice 74 in the head of the pick-up wand 72 opens to a channel (not shown) within the wand, to which a source of vacuum may be connected. As viewed in FIG. 4, the air-knife nozzle 73 underlies the pick-up wand 72 and is short enough to clear the book pages and direct an air stream at the edge of the pages. It is positioned about ¼ inch below the wand so as to fluff the pages prior to contact between the wand and the uppermost page, thereby insuring that the uppermost page is separated from the rest of the pages. An air vacuum line, with a vacuum of approximately 9 to 10 inches Hg, and an air pressure line, delivering air at approximately 20 psi, (neither shown), pass through the pivot shaft and the pivot arm to the pick-up wand orifice and to the air-knife nozzle, respectively.

A controller 76 housed in the stationary base 40 is operatively connected to all the drive members, the sensing members and the imaging members to govern the operation of this apparatus. In the present implementation of this invention the controller used is a Mitsubishi Programmable Controller, FX-16MT-ESS-PLC to which add-on module FX-1PG-PLC has been added for providing high speed clocks and automatic up and down ramping of the apparatus stepper motors.

Figure 6:
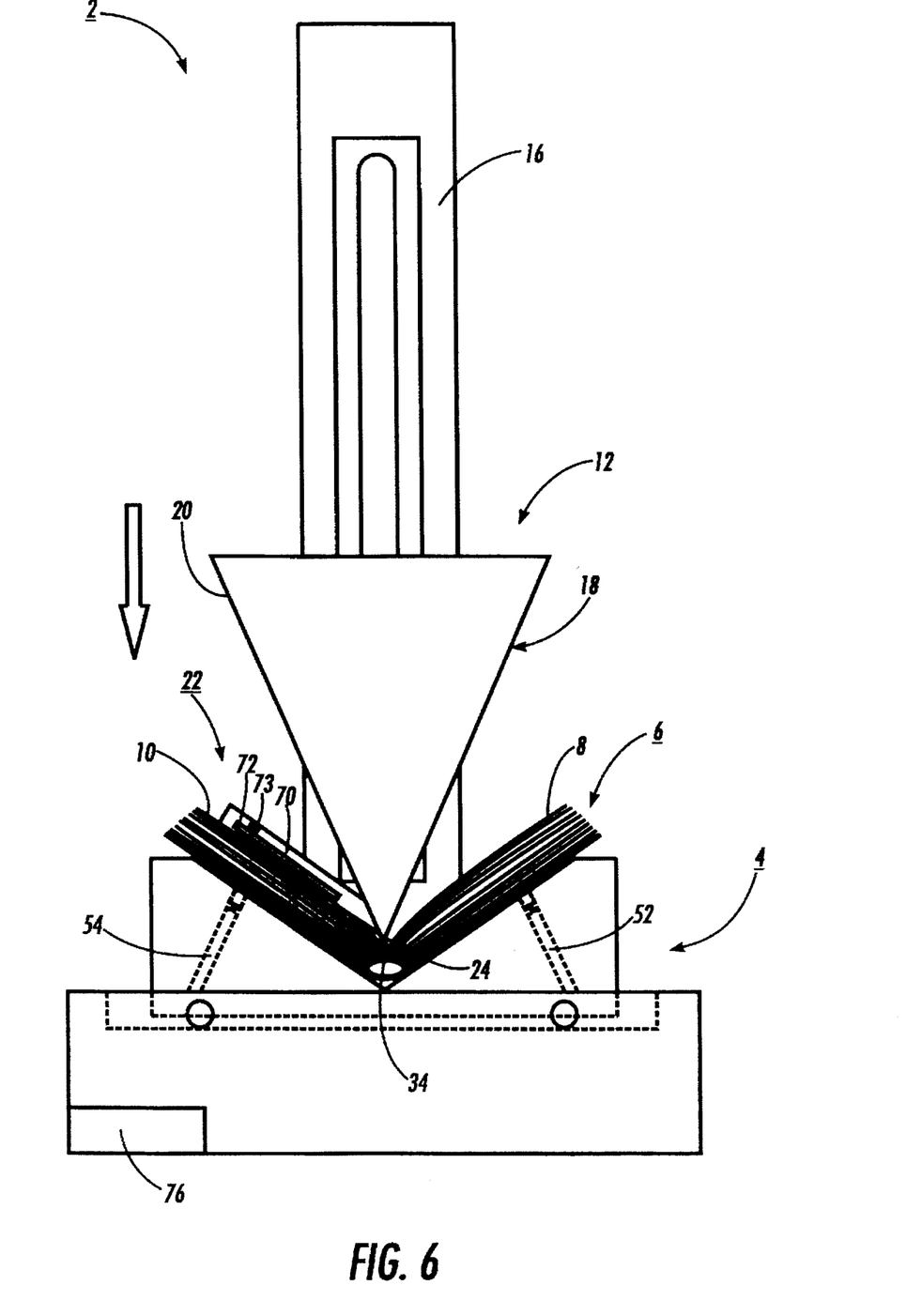
FIG. 6 is a front elevational view of the book imager shown approaching the imaging position.

Turning now to FIGS. 6 to 8 and 4, the operation of the book imager 2 will be described. In FIG. 6 the book imager 2 has been driven from the page turning position (as illustrated in FIG. 1), toward the imaging position. The book 6 is in an open position on the support base 4 with pages 8 and 10 facing upward. The page turning assembly 22 is adjacent page 10 with the pick-up wand 72 in the page clearing position. As the imaging device 12 approaches the book 6, contact is made by the position sensor 34 which signals the controller to terminate its downward movement as the wedge apex edge 24 makes contact with the book in the vicinity of the inter-page axis. If the edge 24 is slightly laterally offset from the axis, it will make contact with one of the pages along its curvature adjacent the axis, and the lateral component of the downward force exerted by the imaging device 12 will drive the book and the carriage 42 incrementally in a lateral direction to self align the edge 24 with the inter-page axis. This will occur as the pages of the book are turned, since the location of the inter-page axis laterally traverses the spine.

Figure 7:
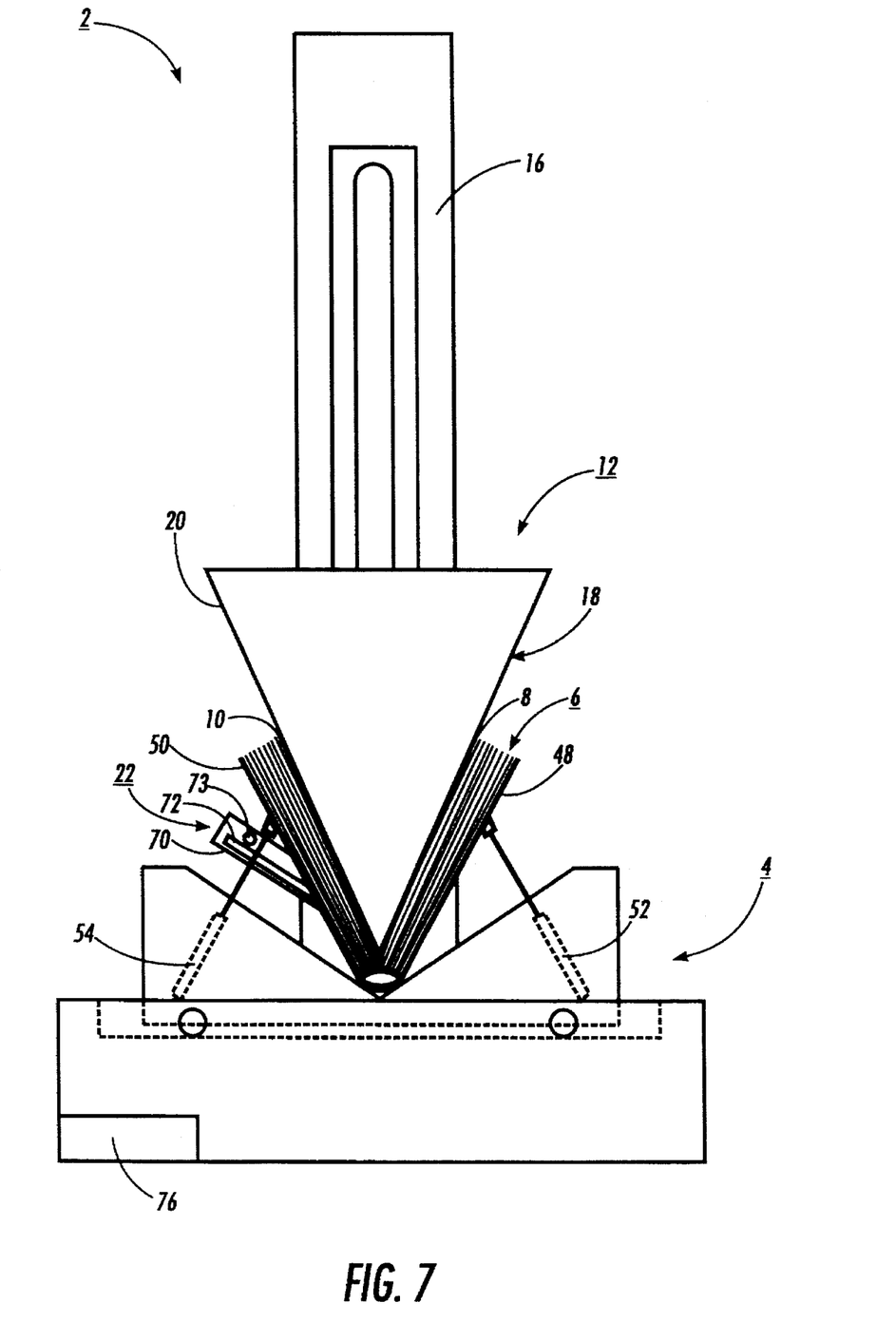
FIG. 7 is a front elevational view of the book imager shown in the imaging position.

In FIG. 7, the imaging position of this apparatus is illustrated. Pistons 52 and 54, have been energized and are forcing the support plates 48 and 50 angularly upward, so as to position the support plates substantially parallel to the detector arrays 18 and 20. Thus, the entire surface of each of the pages 8 and 10 is urged into intimate contact with the detector arrays. The imaging device then simultaneously captures the images of both pages.

Subsequent to imaging, the pistons are deenergized, allowing the book to drop back to the partially open, relaxed, position. The drive assembly 14 moves the imaging device 12 upwardly away from the book 6, and toward the elevated page turning position, illustrated in FIG. 8. Simultaneously, the page turning pivot shaft 68 moves the folded pick-up wand 72 from the vicinity of page 10 to the vicinity of page 8, in a clockwise direction as viewed in this Figure. As the pick-up wand is thus moved, it is unfolded (by a mechanism not shown) to the page pick-up position, overlying page 8. At about the 12 o'clock position, the vacuum and the air pressure are applied through pick-up orifice 74 and air-knife nozzle 73. As the air-knife approaches the pages, the air stream will begin to flutter or fluff them, causing them to separate. This insures that the pages will not stick together and cause page turning faults. When the topmost page is engaged by the wand 82, it is secured thereto by the vacuum through the orifice 74. Then the angular rotation of the page turning pivot shaft 68 is reversed, moving the pick-up wand 72 and the page 8 secured thereto, in a counterclockwise direction, as illustrated in FIG. 4. Since the Bernoulli effect of the air blast may cause the page adjacent to the topmost page to be transported along with it, the air-knife is turned off when the wand has carried page 8 to about the 2:30 o'clock position, allowing the undesired second page to fall back under the influence of gravity. Once page 8 has been transported beyond top dead center, preferably about the 10 o'clock position, the vacuum pressure is terminated, and the wand 72 is folded into the book clearing position. Transported page 8 then drops on top of page 10, under the influence of gravity, and a successive set of unexposed pages are ready for for subsequent imaging.

It should be understood that it may not be desired to image each pair of pages of a book and that it is possible to program the controller such that a single page may be selected for imaging. Furthermore, the controller may be programmed to turn multiple, consecutive, pages independently of imaging in order to present for imaging the desired pages.

It will be appreciated that the present invention is not limited to the design or the specific orientation of the preferred embodiment, and that structures equivalent to those described hereinabove are encompassed within the scope of the present invention. For example, it is contemplated that the book may be placed on a suitable support in a partially open, inverted, page-down position, and the drive assembly may move an imaging device normally positioned below the support, upwardly toward the book. Although a wedge-shaped imaging device has been described, it is within the scope of the present invention to construct the wedge at as small an angle as is feasible in order to accommodate the substrate thickness and the illumination sources.

What is claimed:

1. A book imager, comprising:
   a support upon which a book may be positioned in an open state so as to expose a pair of book pages, said support including a pair of support plates each of which supports one side of an open book and is mounted for angular movement about a pivot axis, and wherein said support further includes force applying members connected to said support plates for moving them angularly;
   an imaging device having a pair of imaging surfaces each being capable of capturing a two-dimensional digital representation of a page, said imaging surfaces are disposed in a wedge configuration converging to an apex edge which is substantially centrally aligned between the pivot axes of said support plates;
   a drive assembly, positioned with respect to said support and said imaging device to impart relative movement therebetween so that said support and said imaging device are relatively movable from a first position to a second position, such that in the first position, said imaging device is located in close proximity to said support to enable imaging of at least one page of the book, and in the second position, said imaging device is located sufficiently remote from said support to enable a page of the book to be turned; and
   a page turner, for advancing one page at a time.

2. A book imager, comprising:

a support upon which a book may be positioned in an open state so as to expose a pair of book pages;

an imaging device having a pair of imaging surfaces each being capable of selectively capturing a two-dimensional digital representation of a page, the pair of imaging surfaces of said imaging device forming an angle of less than 180 degrees relative to one another;

a drive assembly, positioned with respect to said support and said imaging device to impart relative movement therebetween so that said support and said imaging device are relatively movable from a first position to a second position, such that in the first position, said imaging device is located in close proximity to said support to enable imaging of at least one page of the book, and in the second position, said imaging device is located sufficiently remote from said support to enable a page of the book to be turned; and a page turner, for advancing one page at a time.

3. The book imager according to claim 2, wherein said drive assembly moves said imaging device.

4. The book imager according to claim 2, further comprising a proximity sensor associated with said imaging device, said support and said drive assembly, which generates a signal in response to the proximity of said imaging device to a book on said support, for arresting said drive assembly, in response to said signal, at the first position.

5. The book imager according to claim 2, wherein said support includes a pair of support plates each of which is mounted for angular movement about a pivot axis.

6. The book imager according to claim 5, wherein said support includes force applying elements connected to said support plates for moving them angularly toward and away from said imaging device.

7. The book imager according to claim 6, wherein said force applying elements comprise pneumatic pistons.

8. The book imager according to claim 2, wherein said support is movable in a direction perpendicular to the direction of relative movement between said imaging device and said support.

9. The book imager according to claim 2, wherein said support includes a pair of support plates each of which is mounted for angular movement about a pivot axis, said support members being normally oriented relative to one another to form a V-shaped seat for a book.

10. The book imager according to claim 9, wherein said imaging surfaces are disposed in a wedge configuration and converge to an apex edge, and wherein said apex edge is substantially aligned with the apex of said V-shaped seat.

11. The book imager according to claim 2, wherein said imaging device comprises a light source for illuminating book pages through said imaging surfaces, and read-out circuitry connected to each of said imaging surfaces for capturing the digital representation of each page.

12. The book imager according to claim 2, wherein said page turner includes a pick-up arm having a vacuum orifice therein to which a page may be attracted, said arm being mounted for movement from a pick-up position to a turned page position.

13. The book imager according to claim 11, wherein said page turner includes an air knife for separating the page which is to be attracted to said vacuum orifice from its neighboring pages.

14. A book imager, comprising:

a support upon which a book may be positioned in an open state so as to expose a pair of book pages;

an imaging device having a pair of imaging surfaces capable of substantially simultaneously imaging the exposed pair of book pages, said imaging surfaces forming an angle of less that 180 degrees relative to one another;

said support and said imaging device being adapted to move between a first position, wherein said imaging device is located in close proximity to said support, and a second position, wherein said imaging device is located remote from said support.

15. The book imager according to claim 14, further comprising a drive assembly, associated with said imaging device and said support to impart relative movement therebetween.

16. The book imager according to claim 15, wherein said drive assembly moves said imaging device.

17. A method of imaging pages of a book comprising the steps of:

supporting a book upon a support in an open position;

imparting relative motion, in a first direction, between said support and an imaging device having imaging surfaces disposed at an angle, of less than 180 degrees, so as to bring said imaging surfaces into close proximity with said book;

moving said support in a manner to close said book upon said imaging surfaces with the apex edge between said imaging surfaces substantially aligned with the spine of said book and the pages of said book being urged into contact with said imaging surfaces;

capturing a two-dimensional representation of at least one of said pages;

imparting relative motion between said support and said imaging device so as to move said imaging surfaces away from said book;

returning said book to said open position; and turning a page.

18. The method according to claim 17 wherein said step of imparting relative motion comprises moving said imaging device.

19. The method according to claim 17 including the further step of moving said support in a second direction substantially perpendicular to said first direction, said movement in said second direction being effected by interference between said apex edge and said book.

20. The method according to claim 17 including the further step of sensing the proximity of said imaging device to said book, and arresting said relative motion in response thereto.

21. The method according to claim 17 wherein said step of supporting comprises resting said book upon a pair of angularly movable support plates, and said step of moving said support comprises driving said support plates toward and into substantial parallelism with said imaging surfaces.

22. The method according to claim 17 wherein said step of turning a page comprises separating the page to be turned from its adjacent pages by directing an air stream at the edge of the book and capturing the page to be turned with a vacuum transport.

* * * * *